July 1, 1952   T. J. PARKER   2,601,788
HAND TOOL DRIVE
Filed Feb. 1, 1950
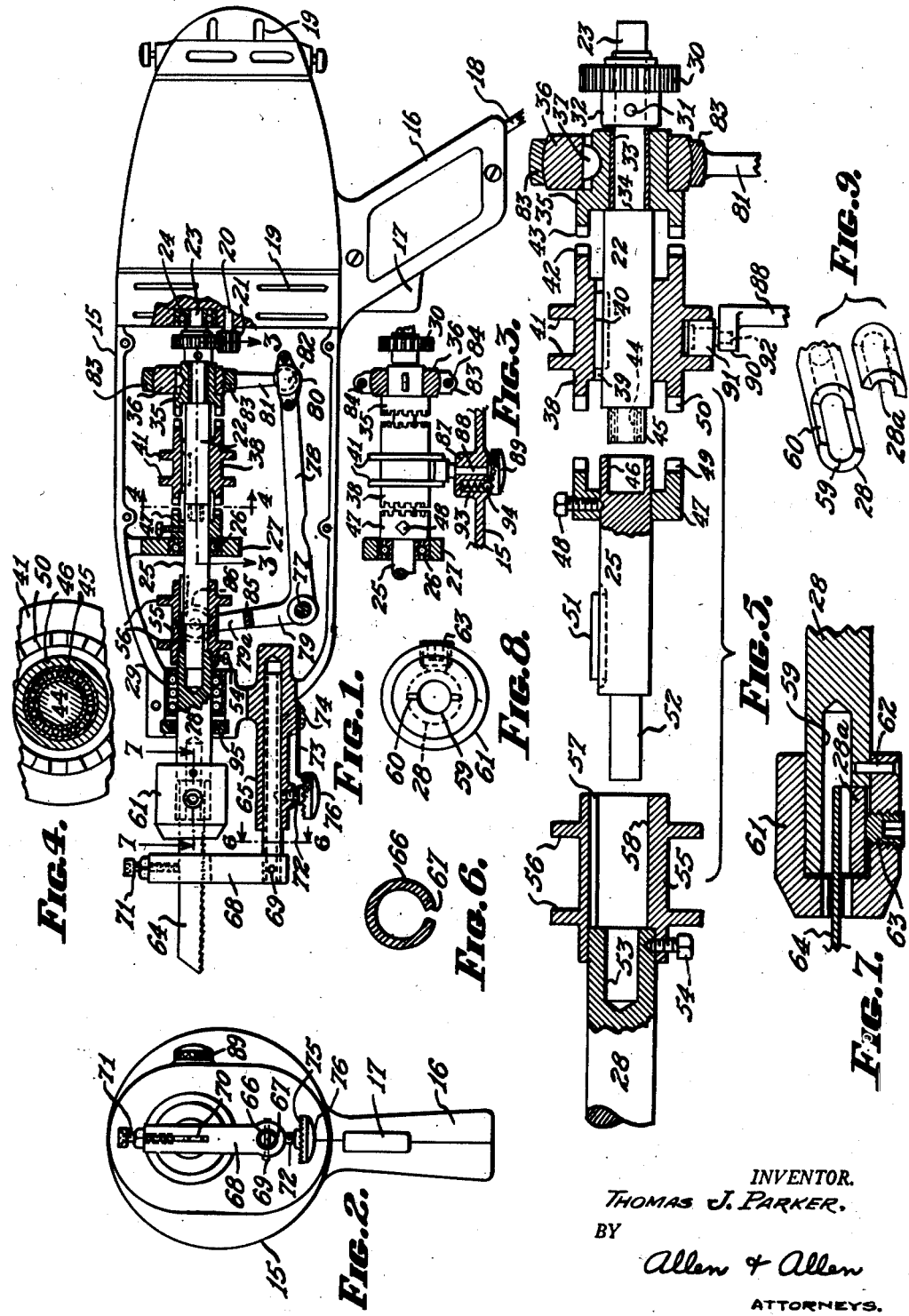
INVENTOR.
THOMAS J. PARKER.
BY
Allen & Allen
ATTORNEYS.

Patented July 1, 1952

2,601,788

UNITED STATES PATENT OFFICE 2,601,788

HAND TOOL DRIVE

Thomas J. Parker, Oaklandon, Ind., assignor to P & L Products, Inc., Cincinnati, Ohio, a corporation of Ohio Application February 1, 1950, Serial No. 141,690

17 Claims. (Cl. 74—40)

My invention resides in the provision of a new and useful hand tool comprising the combination of an electric drill and power hack saw.

It is a primary object of my invention to provide a hand tool which may easily and readily be adapted for use as either an electric drill or a power hack saw at the option of the user, the change from one form to the other requiring no changes in the basic structure of the tool itself.

It is a further object of my invention to provide a hand tool of the type described in which the same shaft is common to both the saw and drill.

Another object of my invention is to provide a simple chuck which may maintain either the saw or drill in operative position in my new hand tool.

Another object of my invention is to provide means whereby the saw and drill shaft may be rotated for drilling operations and reciprocated longitudinally for sawing operations.

A further object of my invention is the provision of mechanism whereby the change over from reciprocation of the saw and drill shaft for sawing operations to rotation thereof for drilling operations, can be accomplished by a very simple manipulation on the part of the operator.

Another object of my invention is to provide novel means for supporting the saw blade exteriorly of the chuck during sawing operations. A still further object of my invention is to provide a hand tool of the type described which may be manufactured economically and which is easy to use.

Other objects and advantages of my invention will become apparent to one skilled in the art during the course of the following description, reference being made to the drawings in which like numerals are used to designate like parts throughout the same, and in which:

Figure 1 is a front elevation with parts broken away and parts in section of my new hand tool.

Figure 2 is an end elevation of this tool taken from the left side of Figure 1.

Figure 3 is an enlarged sectional view taken on the line 3—3 of Figure 1.

Figure 4 is an enlarged sectional view taken on the line 4—4 of Figure 1.

Figure 5 is an exploded view of the various shafts comprising the drive mechanism for my tool.

Figure 6 is a section taken on the line 6—6 of Figure 1.

Figure 7 is an enlarged sectional view taken on the line 7—7 of Figure 1.

Figure 8 is an end view of the left side of the chuck shown in Figure 1.

Figure 9 is an exploded perspective view of the saw and drill shaft utilized with the chuck.

Referring now to Figure 1, it will be observed that my hand tool comprises a casing or housing 15 in the rear end of which is located a suitable electric motor (not shown) preferably of the brush type. The particular type of motor, however, does not constitute a part of my invention, nor does it constitute a limitation thereon. A handle portion is shown at 16 as being provided with a "trigger" 17 by which the electric motor above referred to may be actuated. Electricity is supplied through a suitable cord 18. Slots 19 are provided in the housing for the passage of air around the motor and associated mechanism. A drive shaft 20 is rotated by the electric motor when the switch or trigger 17 is actuated. The shaft 20 and its pinion 21 constitute the main drive provided for my hand tool.

Referring to the forward end of the device of Figure 1, the housing for which has been broken away for the purpose of illustrating the inner mechanism most clearly, it will be observed that I have provided a series of three axially aligned shafts by which power is transmitted from the drive shaft 20 and its pinion 21 to the hack saw or drill, as the case may be. The first of these, which I have designated at 22, has a turned down portion 23 which is suitably positioned in a ball bearing 24 mounted in the rear portion of the housing 15. The second of these shafts is designated at 25 and is maintained in proper position within the tool housing by reason of a ball bearing 26 provided in an extension 27 of the housing proper. The third of these shafts is designated at 28 and is provided with a suitable ball bearing 29 located in the forward end of the housing 15.

Referring now to Figure 5, the detail of the arrangement just described is most clearly seen. A gear 30 is pinned to the shaft 22 by means of a pin 31 extending through the sleeve portion 32 of this gear. A sleeve 33 for the shaft 22 is positioned between the gear portion 32 and the shoulder 34 formed by the turned down portion 23. Arranged to run free on the sleeve 33 is a clutch member 35 which is also maintained in position against longitudinal movement by the gear member 32 and shoulder 34. An eccentric 36 is suitably keyed to the clutch member 35 as by means of a Woodruff key 37 or the like. The function and purpose of the eccentric 36 will be described shortly. A clutch spool 38 is provided with a keyway 39 which cooperates with the key 40 formed on the shaft 22 so as to permit the clutch spool 38 to be moved axially of the shaft 22. The clutch spool 38 is provided with a pair of flanges 41 and with teeth 42 adapted to engage the teeth 43 of the clutch member 35.

The left end of the shaft 22, as viewed in Figure 5, is turned down as at 44 and is provided with a needle bearing 45 which is adapted to just nicely fit within a bore 46 formed within the end of the shaft 25. Thus the shaft 22 is supported at its one end by the ball bearing 24 mounted within the housing proper and at its other end by reason of its needle bearing in the end of the shaft 25, this shaft 25 being supported by a suitable bearing 26 mounted in the housing extension 27 as above described.

A clutch member 47 is secured near one end of the shaft 25 by means of a screw 48. Such clutch member has teeth 49 adapted to be engaged by the teeth 50 of the clutch spool 38. Also fixed in the shaft 25 is a key 51. In addition the shaft 25 is formed with a turned-down portion 52 which is adapted to be slidably received by the bore 53 formed in the shaft 28.

Fixed to the shaft 28 by means of a screw 54 is a shift-spool 55 provided with a pair of flanges 56. The shift-spool 55 is also provided with a key way 57 adapted to receive the key 51 on the shaft 25. The bore 58 of the shift-spool 55 just nicely receives the main portion of the shaft 25. As was above noted, the shaft 28 is suitably mounted within a ball bearing 29 provided in the forward end of the housing 15 provided for my new hand tool.

Referring now to Figures 1, 7, and 8, I shall describe the manner in which the shaft 28 is adapted to operatively receive either drills or saw blades as the case may be. The forward end of the shaft 28 is suitably bored as at 59 so as to receive the various drills used with my device. This end of the shaft 28 is also formed with a slot 60 having a vertical height equal to the diameter of the shaft 28 and extending axially of the shaft 28 throughout a substantial portion of the bore 59. A portion of the forward end of the shaft 58 is sawed through to the slot 60 so that one side 28a of the jaw so formed is loose. This is clearly shown in Figure 9.

A chuck collar 61 just nicely fits over the end of the shaft 28 to which it is held in proper position by means of a small pin 62. An Allen screw 63 is provided in the chuck collar 61 at such position that it will abut against the loose jaw portion 28a. Thus, it will be clear that as the Allen screw is tightened it will abut against the loose jaw member 28a and force it into contact with the saw or drill, as the case may be, and thereby hold the same in perfect position. A set of collets may be furnished for very small drills. In Figures 1 and 7 I have illustrated my device with a saw blade 64 so positioned. The chuck collar 61 is provided with a bore and slot corresponding with the bore 59 and slot 60 formed in the shaft 28.

As is best seen in Figures 1 and 2, I have provided additional means whereby added support may be given to the saw blade when in operative position in my new hand tool. Thus, at the forward end of the housing 15 of my device I have provided a hollow tube 65. Adapted for sliding movement within this tube 65 is a hollow guide shaft 66 in which I have milled a V-shaped slot 67 the full length of it. A saw guide 68 is pinned as at 69 to the shaft 66. The upper end of the guide 68 is provided with a slot 70 through which the saw blade 64 extends. Above the slot 70 in the saw guide 68 I provide a small Allen screw 71 by which the saw may be leveled and by which I can allow for wear. Mounted in the tube 65 is a lock screw 72 having a tapered end which fits the slot 67 formed in guide shaft 66. As this screw is tightened, it spreads the shaft 66 and holds it in fixed position against the inner walls of the tube 65. In order to prevent this screw from being loosened by vibrations, I have provided a lock spring 73 fixed beneath the tube 65 as by the screws 74. To this end the spring 73 is adapted to engage in knurls 75 provided in the head 76 of the lock screw 72. By reason of the tube 65, shaft 66, V-shaped slot 67, and the lock screw 72, the saw guide 68 may be shifted axially of the blade 64 so as to support it at the desired position.

Referring again to Figures 1 and 5, I shall now describe the mechanism by which the shaft 28 is at one time rotated for drilling operations and at another time reciprocated axially for sawing operations. Suitably mounted for pivotal movement about a shaft 77 fixed in the housing 15 is a bell crank having arms 78 and 79. The end of the arm 78 is provided with a socket 80. A connecting rod or pitman 81 having a ball 82 just nicely received by the socket 80 is also provided. Fixed to the pitman 81 are a pair of yokes 83 which are fastened about the eccentric 36 in such manner that the eccentric may rotate within the yokes and thereby give vertical reciprocating movement to the pitman 81. These yokes 83 may be fastened together as at 84 as seen in Figure 3.

The arm 79 of the bell crank is branched as at 85 in order to provide Y-shaped extensions 79a, one of which is clearly seen in Figure 1. To each of these extensions 79a is mounted a roller 86, one of which is shown in dotted lines on Figure 1. These rollers 86 are thus located on either side of the shaft 25 and are adapted to engage the flanges 56 of the shift-spool 55. Such rollers have their axes substantially perpendicular to that of the shafts 22, 25, and 28. Vertical movement of the pitman 81 will rock the bell crank arm 79 about its pivot 77 and thereby bring the rollers 86 into contact with the flanges 56 of the shift-spool 55, such action thereby causing the shift-spool 55 to be moved axially to the right or left, as the case may be, along the center line of the shafts 22, 25, and 28.

Since the shift-spool 55 is fixed to the shaft 28, and since the shift-spool 55 is provided with a key-way 57 adapted to receive the key 51 on the shaft 25, it will be observed that reciprocating vertical movement of the pitman 81 will result in reciprocating longitudinal movement of the shift-spool 55 and the shaft 28 connected thereto. Such latter reciprocation is, of course, that which is desired during sawing operations.

Vertical reciprocating movement of the pitman 81 is obtained when the clutch spool 38 is brought into engagement with the clutch member 35 which, as before said, is mounted for free rotation on the sleeve 33 provided in connection with the shaft 22. Since the shaft 22 is driven directly through the drive shaft 20 and pinion 21 of the electric motor provided for the tool, and since the clutch spool 38 is keyed to the shaft 22, it is apparent that when clutch spool 38 is engaged with the clutch member 35, such latter member will also be driven through the drive shaft 20 and its pinion 21. Rotation of the clutch member 35 will result in rotation of the eccentric 36 which is keyed thereto. As above noted, rotation of the eccentric 36 results in a vertical reciprocating motion being imparted to the pitman 81, whereby the shaft 28 is reciprocated longitudinally through the bell crank 78—79 and shift-spool 55 all as just described. It is to be understood that the movement of the pitman 81 is limited to a vertical reciprocating motion by reason of the fact that the yokes 83 just nicely fit the eccentric 36 and for the additional reason that the bell crank 78—79 is pivotally mounted against lateral movement about the shaft 77. Thus the bell crank 78—79 moves only in a plane which is at right angles to the shaft 77.

When it is desired to rotate the shaft 28 for drilling operations, the clutch spool 38 is shifted to the left as viewed in Figure 1 and thus brought into engagement with the clutch member 47 mounted on the shaft 25. Again, since the shaft 22 is turning at all times the motor is running, and since the clutch spool 38 is keyed to the shaft 22, the shaft 25 is thereby caused to rotate with the shaft 22. Furthermore, since the shaft 25 is provided with a key 51 which fits in the key way 57 of the shift-spool 55, rotation of the shaft 25 will result in similar rotation of the shift-spool 55 and shaft 28 to which it is fixed.

Thus, it is apparent from the above description that whether the shaft 28 is rotated, or whether it is reciprocated, depends on the position of the clutch spool 38. When it is in its leftward position as viewed in Figure 1, rotating movement is imparted to the shaft 28 in the manner just described, it being noted that the eccentric 36 is not now actuated by reason of the fact that the clutch member 35 to which it is fixed is freely mounted on the shaft 22. When the clutch member 38 is, however, shifted to the right, then the clutch member 35 is brought into driving relationship with respect to the shaft 22, the result being that the shaft 28 is reciprocated in the manner just described. I shall now describe how the clutch spool 38 is shifted to the desired position.

The mechanism for shifting the clutch member 38 is best seen in Figure 3, and Figure 5. The housing 15 is provided with an enlarged portion 87 which serves as a bearing for the stem 88 of the shift-knob 89. Fixed to the inner end of the stem 88, or formed integral therewith, is an arm 90. A roller 91 is rotatably mounted on an axle 92 journaled in the arm 90. A turning of the knurled knob 89 will cause the stem 88 to be rotated and the arm 90 thereby moved through an arcuate path lying in a plane perpendicular to the stem 88. The roller 91 is so positioned that it just nicely fits between the flanges 41 provided on the clutch spool 38. Thus when the arm 90 is swung through an arcuate path, the roller 91 acting against the flanges 41 causes the clutch spool to be shifted longitudinally of the shaft 22 depending on the direction of turning of the knob 89. To insure that the clutch spool 38 will be maintained in its proper indexed position, I have provided a spring 93 and ball 94 within the member 87. The underside of the knob 89 will be provided with indentations adapted to receive the ball 94, said indentations being located in positions corresponding to the extreme leftward and rightward positions of the clutch spool 38 and also to its intermediate neutral position.

In operation my device works as follows:

For sawing operations, the Allen screw 63 located in the chuck collar 61 is loosened and a saw blade 64 inserted in the shaft 28 against the slotted portion 60. The Allen screw 63 is then tightened whereby the loose portion 28a is forced into contact with the saw blade 64 thus to position it tightly within the jaw formed by the slotted shaft 28 and collar 61. The lock screw 76 is also loosened and the shaft 66 and saw guide 68 moved to desired position. The lock screw 76 is then tightened whereby the slotted shaft 66 is expanded into tight contact with the tube 65 and the saw guide 68 thereby maintained in fixed position with respect to the saw blade 64. The level of the blade 64 may be adjusted by means of the Allen screw 71.

With the saw blade now in fixed position with respect to the shaft 28, and the guide 68 correctly positioned with respect to the saw blade 64, the device is now ready for use, it now being necessary only to turn the knurled knob 89 so as to bring the clutch spool 38 into operative engagement with the clutch member 35. With the clutch spool so positioned, actuation of the trigger switch 17 will permit current flowing through the cord 18 to energize the electric motor housed within the rear end of my device.

Energization of the motor results in its main drive shaft 20 and pinion 21 being rotated. The shaft 22 is directly driven through its gear 30 and the pinion 21 fixed to the main drive shaft 20 of this electric motor. Such rotation of the shaft 22 results in similar rotation of the clutch spool 38 by reason of the keyed connection 39—40. The member 38 now being in operative relation with the member 35, this latter member is also rotated. Rotation of the member 35 necessarily results in rotation of the eccentric 36 because of the fact that this eccentric is keyed to the member 35 in a manner heretofore described.

Rotation of the eccentric 36 will result in the bell crank 78—79 being rocked about its pivot 77, such rocking movement thereby resulting in longitudinal reciprocation of the shift-spool 55. And, of course, since the shift-spool 55 is fixed to the shaft 28, this shaft too will be reciprocated longitudinally. In this connection, it should be noted that the shift spool is permitted to slide with respect to the shaft 25 by reason of the fact that the key 51 just nicely fits within the keyway 57 and by reason of the additional fact that the shaft 25 is not now rotated, the clutch member 47 being out of contact with the clutch spool 38. It should also be observed that I have provided a conventional grease retainer 95 in connection with the main bearing 29 for the shaft 28 (see Figure 1).

For drilling operations, the Allen screw 63 is loosened, as well as the screw 71, and the saw blade 64 is removed. In addition, the locking screw 76 is loosened and the guide 68 and shaft 66 also removed or turned out of the way. A suitable drill is then placed within the bore 59 of the shaft 28 and loose jaw portion 28a clamped against it in the manner just above described.

The knurled knob 89 is now turned so as to bring the clutch spool 38 into contact with the clutch member 47. Now when the electric motor is supplied with current through the cord 18 and trigger switch 17, its main drive shaft 20 and pinion will engage the gear 30 and thereby drive the shaft 22. The shaft 22 will in turn impart rotation to the shaft 25 through the clutch spool 38 which is keyed to the shaft 22 and clutch member 47 which is fixed to the shaft 25. The shaft 25 will in turn impart rotation to the shaft 28 by reason of its keyed connection 51—57 with the shift-spool 55, this latter spool being fixed to the shaft 28 as at 54. In this manner, my new hand tool is conveniently used for drilling operations, as well as for the sawing operations just described.

Although it does not form a limitation on my invention, it should be noted that I prefer to use a universal type electric motor normally running at 12,000 R. P. M. but back geared to 2000 R. P. M. on the main shaft 20, and generally I prefer to so arrange the eccentric 36, pitman 81 and bell crank 78—79 as to obtain a reciprocating stroke of shaft 28 of about ½ inch. It is a feature of my invention that my hand tool is operable with a minimum amount of vibration, even with a motor and stroke of the type described.

It is to be understood that changes and modifications may be made in my invention without departing from the spirit thereof and although I have, for the purposes of illustration, illustrated a specific embodiment of it, I do not intend to be limited to the specific embodiment herein set forth except insofar as such structure is specifically set forth in the subjoined claims. It is also to be understood that work elements other than hack saws and drills may be used successfully in my new hand tool, for example, files, grinding devices and tools adapted for burring operations.

Having thus described my invention, what I claim as new and desire to be protected by United States Letters Patent is:

1. A hand power tool comprising a first shaft rotated by a motor, another shaft adapted to be rotated and reciprocated, and means in one position to transmit rotation of said first shaft into rotation of said other shaft, and in another position to convert rotation of said first shaft into reciprocation of said other shaft, said means comprising a linkage between said two shafts, said linkage comprising an eccentric on said first shaft, a bell-crank, and means connecting said crank to said eccentric and to said other shaft.

2. A hand power tool comprising a first shaft rotated by a motor, another shaft adapted to be rotated and reciprocated, and means in one position to transmit rotation of said first shaft into rotation of said other shaft, and in another position to convert rotation of said first shaft into reciprocation of said other shaft, said means comprising clutch elements interconnected between said shafts, said clutch elements comprising a first element axially slidably fixed to said first shaft, a shaft intermediate said first shaft and said other shaft, said intermediate shaft being rotatable with respect to said first shaft and non-rotatably connected to said other shaft, a second element fixed to said intermediate shaft, and means to slide said first element into engagement with said second element.

3. A hand power tool comprising a motor, a first shaft driven by said motor, a second shaft coaxial with said first shaft and rotatable with respect thereto, a third shaft coaxial with said first and second shafts and axially slidably and non-rotatably connected to said second shaft, an actuating member freely rotatable on said first shaft and provided with a clutch element, a clutch element on said second shaft, and a shiftable clutch element on said first shaft engageable in one position with the clutch element on said actuating member and in another position with the clutch element on said second shaft, and a linkage connecting said actuating member with said third shaft.

4. The tool of claim 3 in which said actuating member comprises an eccentric and in which said linkage comprises a bell crank.

5. The tool of claim 4 in which the connection between said crank and said eccentric comprises a pitman having a ball maintained in a socket provided on one end of said crank, said pitman being secured to said eccentric by means of yokes fastened thereabout.

6. A hand power tool comprising a motor, a first shaft driven by said motor, a second shaft coaxial with said first shaft and rotatable with respect thereto, a third shaft coaxial with said first and said second shafts and axially slidably and non-rotatably connected to said second shaft, an actuating member freely rotatable on said first shaft and provided with a clutch element, a clutch element on said second shaft, and a shiftable clutch element on said first shaft engageable in one position with the clutch element on said actuating member and in another position with the clutch element on said second shaft, and a linkage connecting said actuating member with said third shaft, said actuating member comprising an eccentric, said linkage comprising a bell-crank, and the connection between said third shaft and said crank comprising a shift-spool fixed to said third shaft and having flanges engaged by an end of said crank.

7. The tool of claim 6 in which said end of said crank is forked, and in which the end of each said fork is provided with a roller which engages said flanges, said rollers engaging said flanges on opposite sides of said shift-spool.

8. A hand power tool comprising a motor, a first shaft driven by said motor, a second shaft coaxial with said first shaft and rotatable with respect thereto, a third shaft coaxial with said first and second shafts and axially slidably and non-rotatably connected to said second shaft, an eccentric freely rotatable on said first shaft and provided with a clutch element, a clutch element on said second shaft, a shiftable clutch element on said first shaft engageable in one position with the clutch element on said eccentric and in another position with the clutch element on said second shaft, a shift-member fixed to said third shaft, a bell crank, said bell crank having a forked arm engaging said shift-member on opposite sides thereof, each of said forks being provided with a roller engaging a flange provided on said shift-member, and a pitman connecting the other arm of said crank with said eccentric, said other arm and said pitman being connected by a ball-socket joint, said pitman being connected to said eccentric by means of yokes fastened thereabout.

9. A power actuated hand tool comprising an electric motor, a housing, a first shaft rotatably mounted in said housing and driven by said motor, a second shaft coaxial with said first shaft, said second shaft being rotatably mounted in said housing, a third shaft coaxial with said first and said second shafts, said third shaft being mounted for both rotating and reciprocating movement in said housing, an actuating member fixed to a first clutch member freely mounted on said first shaft, a shiftable clutch member keyed to said first shaft and axially slidable thereon, a second clutch member fixed to said second shaft, a shift-member fixed to said third shaft, said second shaft extending into said shift-member, said shift-member being axially slidably rotatable connected thereto, motion translating means interconnecting said actuating member and said shift-member, and means selective in one position to engage said first clutch member with said shiftable clutch-member whereby to translate rotating movement of said first shaft into reciprocating movement of said third shaft through said motion translating means, said means being selective in another position to engage said second clutch member with said shiftable clutch member whereby to transmit rotating movement of said first shaft to rotating movement of said third shaft.

10. The tool of claim 9 in which one end of said first shaft has a bearing within said housing and the other end of said shaft has a bearing within one end of said second shaft.

11. The tool of claim 9 in which said second shatf has a bearing in an extension comprising a part of said housing and in which one end of said second shaft has a bearing within a bore provided in one end of said third shaft and within a bore provided in said shift-member.

12. The tool of claim 9 in which said third shaft extends outwardly from said housing and in which the outward end is provided with a chuck whereby work elements may be secured thereto.

13. The tool of claim 9 in which said motion translating means comprises a bell crank rockably mounted on an axis fixed in said housing and a pitman connecting one end of said crank with said actuating member, the other end of said crank operatively engaging said shift-member.

14. The tool of claim 9 in which one end of said first shaft has a bearing within said housing and the other end of said shaft has a bearing within one end of said second shaft, said second shaft having a bearing in a member comprising an extension of said housing, the other end of said second shaft having a bearing within one end of said third shaft and within a bore provided in said shift-member, the other end of said third shaft extending outwardly from said housing and being provided with a chuck.

15. A hand power tool comprising a motor, a first shaft driven by said motor, a second shaft coaxial with said first shaft and rotatable with respect thereto, a third shaft coaxial with said first and second shafts and axially slidably and non-rotatably connected to said second shaft, an actuating member freely rotatable on said first shaft and provided with a clutch element, a clutch element on said second shaft, and a shiftable clutch element on said first shaft engageable in one position with the clutch element on said actuating member and in another position with the clutch element on said second shaft, a linkage connecting said actuating member with said third shaft, and means to effect the shifting of said shiftable clutch element, said means comprising a knob having a stem fixed thereto, an arm fixed to the end of said stem, a roller journaled on an axis located in the end of said arm, said axis being substantially parallel to said stem, and a pair of flanges on said shiftable clutch element engaged by said roller.

16. A hand power tool comprising a motor, a first shaft driven by said motor, a second shaft coaxial with said first shaft and rotatable with respect thereto, a third shaft coaxial with said first and second shafts and axially slidably and non-rotatably connected to said second shaft, an actuating member freely rotatable on said first shaft and provided with a clutch element, a clutch element on said second shaft, and a shiftable clutch element on said first shaft engageable in one position with the clutch element on said actuating member and in another position with the clutch element on said second shaft, a linkage connecting said actuating member with said third shaft, and chuck means provided on the end of said third shaft.

17. A hand power tool comprising a housing, a pair of shafts mounted in said housing, one of said shafts having operative engagement with a motor located in said housing whereby said one shaft is rotated, the other of said shafts being mounted for rotation and reciprocation, means selective to effect an operative engagement between said shafts whereby said other shaft is rotated, and means selective to effect a different operative engagement between said shafts whereby said other shaft is reciprocated, said first mentioned means comprising a clutch element driven by said one shaft and engageable with a second clutch element non-rotatably associated with said other shaft, said second mentioned means comprising an eccentric adapted to be driven with said one shaft and linkage connecting said eccentric with said other shaft.

THOMAS J. PARKER.

REFERENCES CITED

The following references are of record in the file of this patent:

UNITED STATES PATENTS

| Number | Name | Date |
| --- | --- | --- |
| 419,847 | Geisel | Jan. 21, 1890 |
| 1,442,724 | Hogan | Jan. 16, 1923 |
| 1,744,521 | Briese | Jan. 21, 1930 |
| 2,477,755 | Langfelder | Aug. 2, 1949 |